United States Patent
Rogers et al.

(10) Patent No.: US 7,457,326 B2
(45) Date of Patent: Nov. 25, 2008

(54) METHOD AND APPARATUS FOR COHERENTLY COMBINING MULTIPLE LASER OSCILLATORS

(75) Inventors: Jeffrey Rogers, Woodland Hills, CA (US); Monica Minden, Monte Nido, CA (US); Hans W. Bruesselbach, Monte Nido, CA (US); Cris Jones, Malibu, CA (US)

(73) Assignee: HRL Laboratories, LLC, Malibu, CA (US)

( * ) Notice: Subject to any disclaimer, the term of this patent is extended or adjusted under 35 U.S.C. 154(b) by 585 days.

(21) Appl. No.: 10/759,510

(22) Filed: Jan. 15, 2004

(65) Prior Publication Data

US 2004/0165620 A1 Aug. 26, 2004

Related U.S. Application Data

(60) Provisional application No. 60/441,027, filed on Jan. 17, 2003, provisional application No. 60/441,026, filed on Jan. 17, 2003.

(51) Int. Cl.
*H01S 3/30* (2006.01)

(52) U.S. Cl. ............. 372/6; 372/32; 372/50.12

(58) Field of Classification Search ........... 372/6, 372/32
See application file for complete search history.

(56) References Cited

U.S. PATENT DOCUMENTS

| | | | |
|---|---|---|---|
| 4,360,372 A | 11/1982 | Maciejko | 65/4.21 |
| 4,757,268 A | 7/1988 | Abrams et al. | 330/4.3 |
| 4,915,467 A | 4/1990 | Berkey | 385/43 |
| 4,932,747 A | 6/1990 | Russell et al. | 350/96.24 |
| 5,045,100 A | 9/1991 | Smith et al. | 65/410 |
| 5,175,779 A | 12/1992 | Mortimore | 385/43 |
| 5,303,373 A | 4/1994 | Harootian | 385/115 |
| 5,396,506 A | 3/1995 | Ball | 372/6 |
| 5,408,556 A | 4/1995 | Wong | 385/48 |
| 5,566,196 A | 10/1996 | Scifres | 372/6 |
| 5,852,699 A | 12/1998 | Lissotschenko et al. | 385/115 |
| 5,881,189 A | 3/1999 | Carberry et al. | 385/39 |

(Continued)

FOREIGN PATENT DOCUMENTS

EP 0 547 335 A2 6/1993

(Continued)

OTHER PUBLICATIONS

Kapany, N.S., et al., "Coherent Interactions Between Optical Waveguides and Lasers," *Jounrnal of the Optical Society of America*, vol. 58, No. 9, pp. 1176-1183 (Sep. 1968).

(Continued)

*Primary Examiner*—Dung T Nguyen
(74) *Attorney, Agent, or Firm*—Ladas & Parry

(57) ABSTRACT

A laser apparatus having multiple laser devices coupled together. The laser devices include optical fibers with laser active regions. Each of the fibers has a reflector disposed at one end and is connected to a combiner on the other end. A laser pump device for each fiber provides pump energy to the laser active regions. Light propagating in the fibers interacts so as to form inphase states. The array of fibers may be coupled either in pairs or altogether between the reflector and the laser active region.

34 Claims, 6 Drawing Sheets

U.S. PATENT DOCUMENTS

| | | | |
|---|---|---|---|
| 5,936,980 A | 8/1999 | Espindola et al. | 372/6 |
| 5,946,130 A * | 8/1999 | Rice | 359/349 |
| 6,134,362 A | 10/2000 | Au-Yung et al. | 385/43 |
| 6,208,678 B1 | 3/2001 | King | 372/72 |
| 6,272,155 B1 | 8/2001 | Sekiguchi | 372/6 |
| 6,366,356 B1 | 4/2002 | Brosnan et al. | 356/477 |
| 6,385,371 B1 | 5/2002 | Li | 385/43 |
| 6,400,871 B1 | 6/2002 | Minden | 385/39 |
| 6,411,323 B1 * | 6/2002 | Waarts et al. | 347/241 |
| 6,411,762 B1 | 6/2002 | Anthon et al. | 385/123 |
| 6,434,302 B1 | 8/2002 | Fidric et al. | 385/43 |
| 6,515,257 B1 | 2/2003 | Jain et al. | 219/121.73 |
| 6,600,765 B2 * | 7/2003 | Evans et al. | 372/50.1 |
| 6,827,500 B2 | 12/2004 | Basavanhally et al. | 385/80 |
| 6,862,386 B2 | 3/2005 | Corio et al. | 385/43 |
| 7,068,949 B2 * | 6/2006 | Jung et al. | 398/195 |
| 2003/0031415 A1 | 2/2003 | Gonthier et al. | 385/43 |
| 2003/0123801 A1 | 7/2003 | Rolston | 385/43 |
| 2004/0057475 A1 * | 3/2004 | Frankel et al. | 372/25 |
| 2004/0165827 A1 | 8/2004 | Bruesselbach et al. | 385/46 |
| 2005/0163443 A1 | 7/2005 | Antos et al. | 385/123 |

FOREIGN PATENT DOCUMENTS

| | | |
|---|---|---|
| GB | 2 154 364 A | 9/1985 |
| GB | 2 191 873 A | 12/1987 |
| WO | 2004/001919 A1 | 12/2003 |
| WO | 2004/068652 A3 | 8/2004 |

OTHER PUBLICATIONS

Kozolov, V.A., et al., "All-Fiber Coherent Beam Combining of Fiber Lasers," *Optics Letters*, vol. 24, No. 24, pp. 1814-1816 (Dec. 15, 1999).

Lyndin, N.M., et al., "Laser System Composed of Several Active Elements Connected by Single-Mode Couplers," *Quantum Electronics*, vol. 24, No. 12, pp. 1058-1061 (1994).

Morel, J., et al., "Coherent Coupling of an Array of $Nd^{3+}$-Doped Single-Mode Fiber Lasers by Use of an Intracavity Phase Grating," *Optics Letters*, vol. 18, No. 18, pp. 1520-1522 (Sep. 15, 1993).

Sabourdy, D., et al., "Efficient Coherent Combining of Widely Tunable Fiber Lasers," *Optics Express*, vol. 11, No. 2, pp. 87-97 (Nov. 22, 2002).

Sabourdy D., et al., "Power Scaling of Fibre Lasers with All-Fibre Interferometric Cavity," *Electronics Letters*, vol. 38, No. 14, pp. 692-693 (Jul. 4, 2002).

Shirakawa, A., et al., "Coherent Addition of Fiber Lasers by Use of A Fiber Coupler," *Optics Express*, vol. 10, No. 21, pp. 1167-1172 (Oct. 21, 2002).

U.S. Appl. No. 10/893,105, filed Jul. 15, 2004, Minden et al.

U.S. Appl. No. 10/893,106, filed Jul. 15, 2004, Minden et al.

Kawasaki, B.S., et al., "Biconical-taper single-mode fiber coupler", Optical Society of America vol. 6, No. 7 (Jul. 1981).

U.S. Appl. No. 10/759,511, filed Jan. 15, 2004, Brusselbach et al.

* cited by examiner

METHOD AND APPARATUS FOR COHERENTLY COMBINING MULTIPLE LASER OSCILLATORS

CROSS-REFERENCE TO RELATED APPLICATIONS

This patent application is related to and claims the benefit of now abandoned U.S. Provisional Patent Application Ser. No. 60/441,027, filed on Jan. 17, 2003 and titled "Method and Apparatus for Coherently Combining Multiple Laser Oscillators." The disclosure of U.S. Provisional Patent Application No. 60/441,027 is incorporated herein by reference in its entirety.

The subject matter of the present application may also be related to the now abandoned U.S. Provisional Patent Application Ser. No. 60/441,026, file on Jan. 17, 2003 and titled "Method and Apparatus for Combining Laser Light." The contents of this U.S. Provisional Patent Application Ser. No. 60/441,026 are incorporated by reference herein in their entirety.

The subject matter of the present application may also be related to the co-pending U.S. patent application Ser. No. 10/759,511, filed of even date herewith and titled "Method and Apparatus for Combining Laser Light." The contents of this U.S. patent application Ser. No. 10/759,511 are incorporated by reference herein in their entirety.

BACKGROUND

1. Field

This disclosure relates generally to lasers and more particularly to combining multiple laser oscillators to produce a higher intensity output.

2. Description of Related Art

Many potential laser applications such as laser communications, industrial material processing, and remote sensing require the use of laser sources producing high brightness light. High brightness can be generally defined as high power per unit area per unit bandwidth per unit solid angle. Producing high brightness from a single laser source is generally limited by the fact that there is an inherent limit to the power or energy per unit volume that can be extracted from or stored in a lasing medium. Alternatively, high brightness laser output may be obtained from an array of coherent lasers that have approximately the same phase.

One method known in the art for providing a higher power laser output comprises directing the output from a master laser oscillator to several laser gain elements. U.S. Pat. No. 4,757,268, issued Jul. 12, 1988 to Abrams et al., describes such a laser apparatus with N parallel laser gain elements. If the outputs of the N laser gain elements sum incoherently, a brightness equal to N times the brightness of a single laser gain element results. However, in Abrams et al., phase conjugate reflector means are disposed in the optical path of the laser gain elements to provide that the laser beams traveling through the individual laser gain elements sum coherently. This coherent summation of the laser beams provide that the resultant laser apparatus output will have a peak brightness proportional to $N^2$ times the brightness of a single laser gain element. Hence, coherent combination of laser outputs provides for substantial increases in laser output brightness.

The laser apparatus described by Abrams et al. uses a master oscillator comprising laser devices such as Nd:YAG crystals or diode lasers and several additional optical elements to ensure that the light traveling within the apparatus is properly polarized and directed. Hence, the apparatus described by Abrams may be expensive and difficult to implement.

High power laser systems utilizing a fiber laser as a master oscillator are also known in the art. Fiber lasers are relatively compact and efficient, which reduces the power and weight requirements for systems based on fiber lasers. However, the power output of a single fiber laser without amplification or other power increasing techniques is relatively low. U.S. Pat. No. 6,366,356, issued Apr. 2, 2001 to Brosnan et al., discloses a laser system using a diode pumped fiber laser as a master oscillator and a plurality of fiber amplifiers connected to the master oscillator. The outputs from the plurality of fiber amplifiers are collimated by a lens array to produce a single high power laser beam output.

As briefly described above, coherent combination of multiple laser beams provides a power-law increase in power output. Therefore, Brosnan describes an additional electronic apparatus to correct the phase of the output provided by each fiber amplifier. The ability to compensate for the relative optical phase shifts among the array of fiber amplifiers provides for the preferred coherent combination of outputs. However, the additional circuitry required to detect and compensate for the relative optical phase shifts increases the complexity of the system disclosed by Brosnan. Also, fiber amplifiers are generally less efficient than fiber oscillators (lasers). Therefore, the array of fiber amplifiers disclosed by Brosnan would provide less power than an array of fiber oscillators of the same number. Hence, the system disclosed by Brosnan would be considered less efficient than a system based on a plurality of fiber oscillators.

Other high power laser systems based on fiber lasers avoid fiber amplifiers by using multiple-core coupler fiber oscillators. U.S. Pat. No. 5,566,196, issued Oct. 15, 1996 to Scifres, describes a fiber laser with two or more generally parallel, nonconcentric doped core regions. The use of multiple cores spreads the light over a larger area of the fiber, thereby reducing the laser power density and reducing the nonlinear optical effects that would otherwise occur at high light intensities. Scifres discloses that the cores may be positioned far enough apart to ensure that light propagating in one core intersects only minimally with light propagating in the other cores, so that each core forms a completely independent laser. However, this configuration does not provide for phase-locking between the light propagating in each of the cores. Scifres also discloses spacing the neighboring cores sufficiently close such that interaction of the light in the cores does occur, thereby providing a phase-locked array of laser emitters in the fiber.

A key problem with multiple-core fiber oscillator systems, such as the system disclosed by Scifres, is heat dissipation. Since the cores are disposed parallel and adjacent to each other along the entire active region of the cores, the heat from each core will be partially transmitted to the adjacent cores. Hence, the power of the multiple-core fiber oscillator systems will be limited by the ability to dissipate the heat generated by the active regions away from the multiple-core fiber, similar to the way that glass rod lasers are limited in average power scaling.

U.S. Pat. No. 6,272,155, issued Aug. 7, 2001, to Sekiguchi describes the creation of a high intensity optical source through the creation of a high density group of incoherent fibers. See, for example, FIG. 3 of U.S. Pat. No. 6,272,155. If the fibers do not interact, they will lase with their own characteristic frequencies (spectrum of longitudinal modes) and thereby be incoherent. Sekiguchi discloses that the fibers are to be positioned relative to one another such that they do not interact. The total power output will then increase proportional to the number of sources (N) simply due to energy conservation.

Therefore, there exists a need in the art for a laser system that incorporates the use of low cost and efficient fiber lasers to generate a higher power laser output or outputs, while reducing the limitations on power output caused by heat dissipation and avoiding the complexity of electronic compensation of the outputs of the fiber lasers.

SUMMARY

Embodiments of the present invention provide a method and apparatus for coupling a plurality of lasers and utilizing interactions between the plurality of lasers to form a coherent optical output. Embodiments of the present invention preferably utilize fiber lasers with sufficient connectivity to produce a higher intensity laser output. The coupling of the fiber lasers may be accomplished by using any of a number of techniques well known in the art. Preferred embodiments of the present invention may use devices that are fabricated using relatively standard optical fiber melting, combining, and pulling techniques to couple the fiber lasers.

Embodiments of the present invention produce a coherent state among a plurality of lasers without relying upon additional amplifiers. Combiners are used to implement the proper connectivity in coupling the laser light produced by the lasers so that the lasers form inphase states. The combiner may comprise a reflector and the coherent coupler disclosed in U.S. Provisional Application Ser. No. 60/441,026 or U.S. patent application Ser. No. 10/759511.

A first embodiment of the present invention provides a method of coherently combining multiple laser oscillators comprising: providing a plurality of lasers; coupling the plurality of lasers; configuring the coupling between the plurality of lasers so that each laser interacts with at least one other laser to pull an intrinsic frequency distribution of the at least one other laser, where the interactions between the lasers form a coherent optical output.

Another embodiment of the present invention provides an apparatus comprising: a plurality of optical fibers, each optical fiber having a first reflector disposed at a first end and having a laser active region comprising laser active material; one or more laser pump devices for applying pump energy to the laser active region of each optical fiber of the plurality of optical fibers; and a combiner coupled to a second end of each of the optical fibers, the combiner combining light directed from the plurality of optical fibers and producing an optical output, where the combiner is configured to couple the light directed from each fiber so that the light from one fiber interacts with at least one other fiber to pull an intrinsic frequency distribution of the light of the at least one other fiber.

Still another embodiment of the present invention provides a laser apparatus comprising: a plurality of laser devices; and a first means for coupling the plurality of laser devices, the first means coupling the plurality of laser devices so that laser light of each laser device interacts with the laser light of at least one other laser device to pull an intrinsic frequency distribution of at least one other laser device; where the interactions between the laser light of the plurality of laser devices form a coherent optical output.

Some embodiments of the present invention generally comprise an apparatus having a plurality of fibers with laser active regions coupled together. Each of the fibers has a reflector disposed at one end and is connected to a combiner on the other end. A laser pump device for each fiber provides pump energy to the laser active regions. Light propagating in the fibers interacts so as to form inphase states. The array of fibers may be coupled either in pairs or altogether between the reflector and the laser active region.

BRIEF DESCRIPTION OF THE DRAWINGS

The features and advantages of the present invention will become better understood with regard to the following description, appended claims, and accompanying drawings.

FIG. 7 compares the expected increase in output power if the fiber lasers in FIG. 6 are operating inphase to actual measurements as additional fiber lasers are turned on.

DETAILED DESCRIPTION

Figure 1:
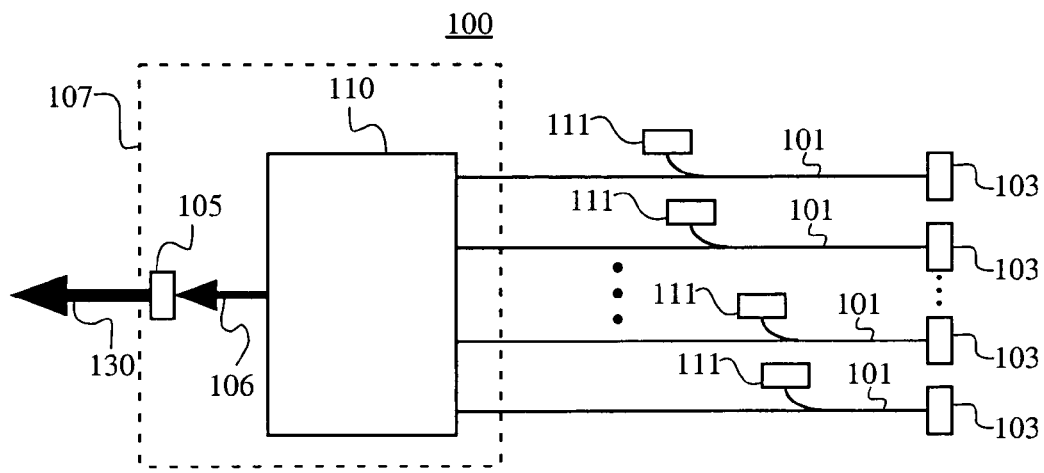
FIG. 1 shows a generalized embodiment of a laser apparatus according to the present invention.

The present invention will now be described more fully hereinafter with reference to the accompanying drawings, in which preferred embodiments of the invention are shown. This invention may be embodied in many different forms and should not be construed as limited to the embodiments set forth herein. Further, the dimensions of certain elements shown in the accompanying drawings may be exaggerated to more clearly show details. The present invention should not be construed as being limited to the dimensional relations shown in the drawings, nor should the individual elements shown in the drawings be construed to be limited to the dimensions shown.

FIG. 1 shows a generalized embodiment of a laser apparatus 100 according to the present invention. In FIG. 1, a plurality of fibers 101 with regions comprising a lasing medium are coupled together at one end of a combiner 107 having a coupler 110 and a second reflector 105. A first reflector 103 is disposed at the other end of each fiber 101. The coupler 110 directs light to a second partially transmissive reflector 105. The second reflector 105 both reflects light back to the coupler 110 and produces an optical output 130. The combiner 107 provides an output 106 which may be a freespace element or confined to an optical element such as a fiber or waveguide.

Each fiber 101 of the plurality of fibers receives pump energy from a corresponding laser pump device 111.

The coupler 110 couples the laser light produced by the pumped fibers 101 such that the pumped fibers form inphase states. Preferably, the Q's of the individual resonators formed by the pumped fiber 101 are kept as low as possible to allow the different resonators to pull each other's intrinsic frequency distributions. This facilitates the formation of inphase states. Low Q's in the apparatus 100 depicted in FIG. 1 may be realized by using a weakly reflecting transmissive reflector 105.

Figure 2:
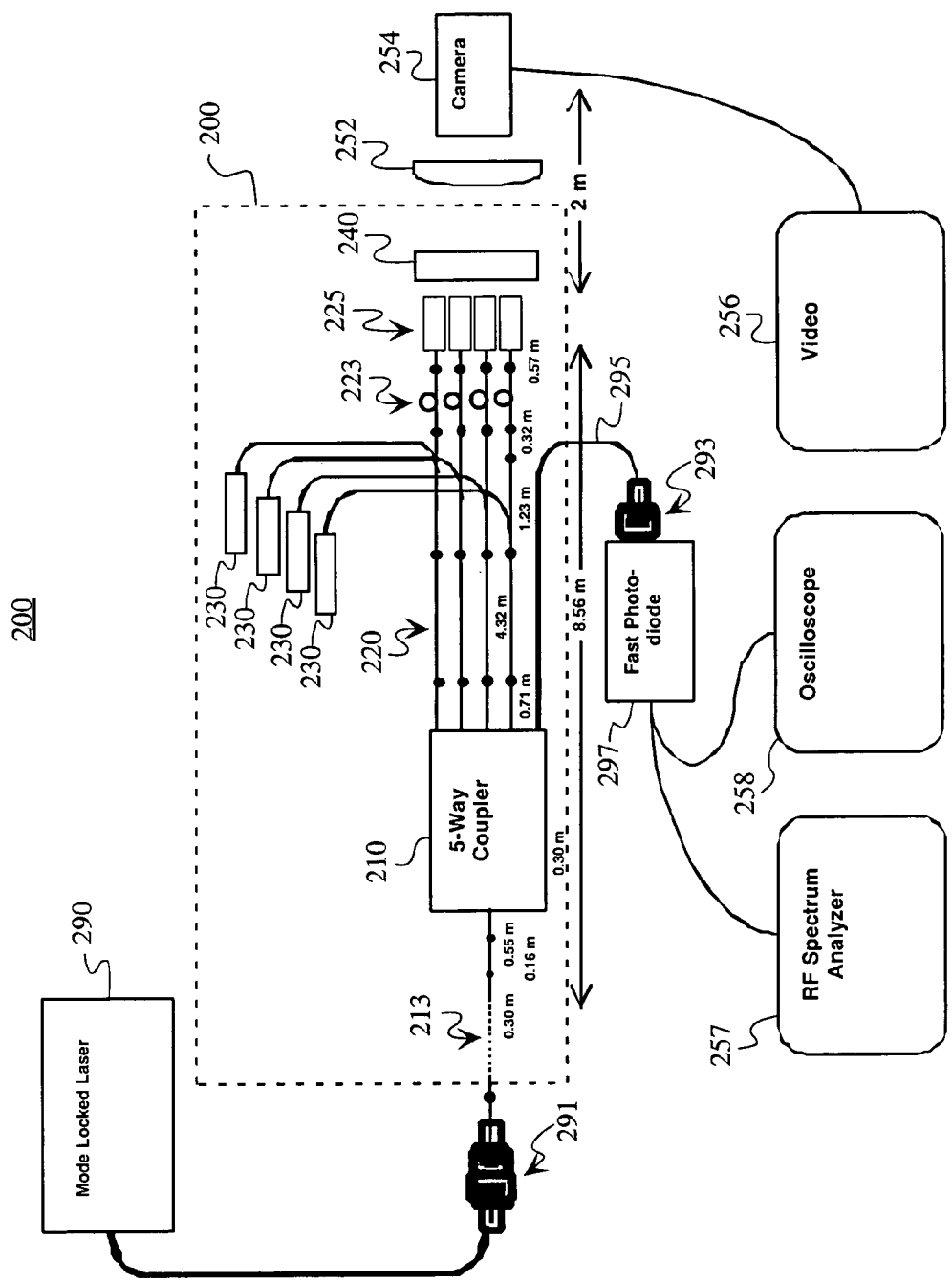
FIG. 2 shows an experimental set-up using a laser apparatus according to an embodiment of the present invention that also demonstrates that phase coherence may be achieved by appropriately coupling fiber lasers.

An experimental set-up using another embodiment of the present invention is depicted in FIG. 2. The laser apparatus 200 depicted in FIG. 2 comprises a set of coupled fiber lasers, which may be assembled from commercial-off-the-shelf optical components. In the apparatus 200 depicted in FIG. 2, four Nd-doped fibers 220 are coupled together with a five-way coupler 210. The fifth input port of the five-way coupler 210 is connected to a fast photo-diode 297 for analysis purposes, as discussed below. The fibers 220 are provided with laser pump energy from pump devices 230, preferably 813 nm diode pump lasers. Polarization controllers 223 are disposed at the ends of the fibers 220 opposite the coupler 210. Collimators 225, preferably 0.5 mm $\omega_0$, spaced at 1 mm, are also disposed at the ends of the fibers 220 opposite the coupler 210 to provided a collimated beam, which is directed to a partial mirror 240. A very high reflectivity broadband grating 213 is disposed at the terminal of the coupler 210, so that laser resonant cavities are formed between the partial mirror 240 and the high reflectivity grating 213.

In the apparatus 200 depicted in FIG. 2, coupling between the fiber oscillators is implemented by the doped fibers 220 via the five-way coupler 210 and the very high reflectivity broadband grating 213. The coupling between the oscillators relative to the Q of a particular oscillator can be varied by changing the output coupling of the oscillators. As briefly noted above, the laser output of the apparatus 200 is provided by the partial mirror 240 disposed at the collimators 225. Hence, the output coupling results from the reflectivity of the partial mirror 240, which is preferably disposed about 1 cm from the collimators 225. The output coupling is also affected by the very small reflectivity of the collimators 225. Preferably, the lengths of the doped fibers 220 are adjusted to provide the desired operation of the apparatus 200.

In the experimental set-up depicted in FIG. 2, a mode-locked pulsed laser 290 injects optical pulses into the individual fibers 220 and the relative output arrival times are measured. In the set-up shown in FIG. 2, these measurements are used to trim the laser oscillators to the same length within a few millimeters. The approximate lengths in meters of the various fiber sections are shown as the small annotations near the fibers 220 in FIG. 2. Note the lengths shown in FIG. 2 are not to scale.

With the fiber oscillators having nearly the same lengths, the combs of modes of the oscillators have the possibility of overlap, that is, the mode spacing of all the oscillators will be nearly the same, even though the absolute free-running frequencies may not be. In initial experiments with the experimental set-up depicted in FIG. 2, the Q's of the individual oscillators were made as low as possible by using only a very weakly reflecting (less than 4%) partial mirror 240 at the output. The low Q's allowed the different fiber oscillators to pull each other's intrinsic frequency distributions.

However, it is not necessary for the fiber oscillators to have the same lengths or nearly the same lengths in embodiments according to the present invention. The fiber oscillators may differ in length by as much as 10% or more. However, the lengths of the fiber oscillators should be close enough to allow resonators realized by each of the fiber oscillators to pull each other's intrinsic frequency distributions and thus obtain coherence.

The additional test equipment coupled to the apparatus 200 depicted in FIG. 2 allows for the performance of the apparatus 200 to be measured. As noted above, a mode-locked laser 290 injects optical pulses into the apparatus 200 to measure fiber lengths. The mode-locked laser 290 is coupled via connectorized fibers 291 to the end of the broadband grating 213 opposite the coupler 210. As briefly noted above, optical signals from one arm of the coupler 210 are directed via optical fiber 295 connected via an optical coupler 293 to a fast photodiode 297. The fast photodiode 297 produces electrical signals, which are directed to a RF spectrum analyzer 257 and an oscilloscope 258. A lens 252 and camera 254 capture images of the output laser beam for a video display 256. The RF spectrum analyzer 257 produces an RF spectra display and the video display 256 shows interference fringe data, both of which are used to ascertain the phase coherence of the output beam.

Figure 3:
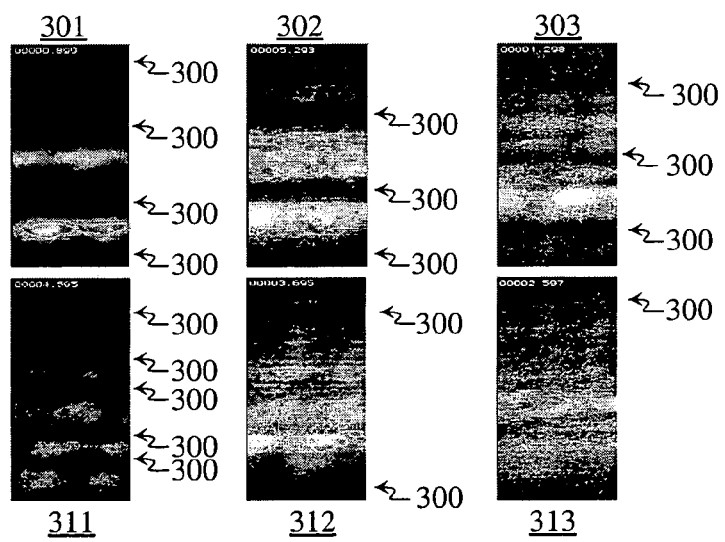
FIG. 3 shows the observed interference fringes for alternative configurations of the experimental set-up depicted in FIG. 2.

Experiments were conducted with the experimental set-up shown in FIG. 2. Three experimental configurations of the experimental set-up were tested and the interference fringe patterns as displayed by the video display 256 were observed. The observed interference fringe patterns are shown in FIG. 3. Reference character 301 identifies the best pattern obtained from the first experiment and reference character 311 identifies the worst pattern obtained from the first experiment. Reference character 302 identifies the best pattern obtained from the second experiment and reference character 312 identifies the worst pattern. Reference character 303 identifies the best pattern obtained from the third experiment and reference character 313 identifies the worst pattern.

In the first experimental configuration, the mode-locked laser 290 was used as a highly coherent master oscillator to supply multiple coherent laser signals to the fibers 220 through the coupler 210. Hence, the fibers 220 acted as fiber amplifiers. Both the best interference pattern 301 and the worst interference pattern 311 show multiple black nulls (identified with reference character 300), indicating coherence between the outputs of the four fibers 220 in the far field.

In the second experiment, the mode-locked laser 290 was not used to supply a laser input. Instead, the fibers 220 were solely pumped with the laser pump devices 230 to act as parallel fiber lasers. A medium output coupling, that is, relatively high Q, was used at the output of the fibers 220. In the absence of the different lasers being coherent, the interference patterns should simply show a time-dependent blur, representing four independent lasers, each one operating in several hundred longitudinal modes. However, the best interference pattern 302 and the worst interference pattern 312 still show the presence of at least some nulls 300, indicating some coherence between the fiber outputs. The time dependence displayed by the fringes indicated that the laser array was not remaining at a constant frequency, but the relatively long durations of the well-defined fringes indicate that the coherent states were stable to some extent. Further, the fuzzier looking patterns may have indicated the loss of coherence or that jumps between coherent states were too rapid for the video to catch.

In the third experiment, the fibers 220 were again configured as parallel fiber lasers (no master oscillator was used). A low output coupling (low Q) was used with the fiber lasers. The best interference pattern 303 and the worst pattern 313 still show the presence of some nulls 300, although the both patterns 303, 313 were a bit fuzzier than the patterns observed with the other two configurations. However, this experiment showed that coherence between the fiber oscillators was still obtained in a low Q output coupling state.

Figure 4:
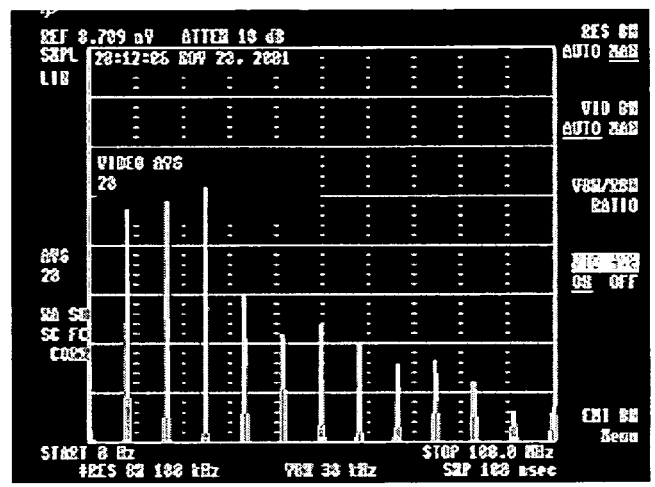
FIG. 4 shows a spectrum analyzer output of a comb of frequencies generated with the experimental set-up depicted in FIG. 2.

FIG. 4 shows a homodyne spectrum observed with the spectrum analyzer 257. FIG. 4 shows that only a single comb of frequencies was present. Although not shown in FIG. 4, during the testing of the apparatus, pulling of the individual modes could be observed on the spectrum analyzer 257 by turning one or another of the lasers on or off.

Figure 5:
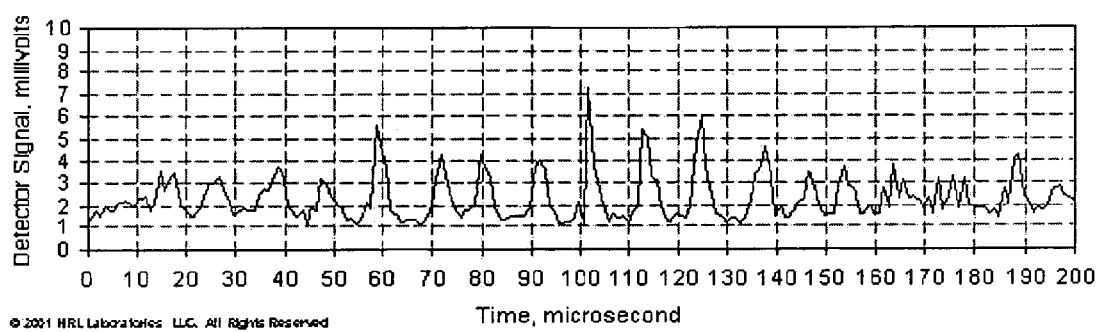
FIG. 5 depicts an oscilloscope output for the experimental set-up depicted in FIG. 2, where significant peaks in power output are seen over time.

FIG. 5 shows the temporal behavior of the apparatus 200 when configured in the low output coupling state. The output of the fast photodiode 297 was directed to the oscilloscope 258. FIG. 5 shows the oscilloscope display for a short time sample. As shown in FIG. 5, the output fluctuates in time, but there are significant peaks in the power output, indicating a strong interaction between the four fiber oscillators.

Figure 6:
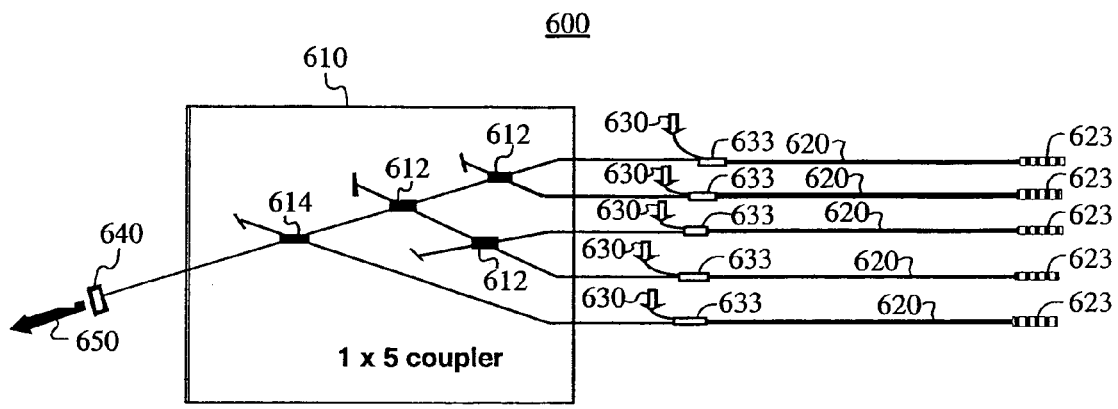
FIG. 6 shows another embodiment of a laser apparatus according to the present invention.

An alternative embodiment of a laser apparatus 600 according to the present invention is shown in FIG. 6. In FIG. 6, a five-way coupler 610, similar to the five-way coupler 210 used in the apparatus 200 shown in FIG. 2, couples together five fiber segments 620 comprising laser active material. Each fiber segment 620 is doped with doping material. Each fiber segment 620 is preferably doped with Nd in this embodiment, and is pumped by a laser pumping device 630, such as a diode pump. The pump energy may be coupled to the fiber segments 620 using commercial coupling devices 633, such as WDM couplers. Each fiber segment 620 is terminated at one end with a fiber reflecting grating 623. The other end of each fiber segment 620 is coupled to the five-way coupler 610. The five-way coupler 610 preferably comprises three 50%-50% couplers 612 and one 80%-20% coupler 614. The output of the five-way coupler is directed to a partially reflecting reflector 640, which both reflects light back into the coupler and transmits a laser output 650.

The laser apparatus 600 depicted in FIG. 6 differs from the apparatus 200 depicted in FIG. 2 in that the reflectors that facilitate the formation of the fiber oscillators have been flipped. That is, each fiber segment 620 is directly coupled to a highly reflective device, that is, the fiber grating reflectors 623, and the partially reflecting device 640 is disposed at the output of the five-way coupler 610. Also, the output of the five-way coupler 610 is considered as the output of the laser apparatus 600, rather than the multiple collimated outputs of the apparatus 200 depicted in FIG. 2. The arrangement of the fiber oscillators and the five-way coupler 610 also facilitates the measurement of the output of the apparatus where all lasers overlap, that is, at the output of the five-way coupler 610.

Figure 7:
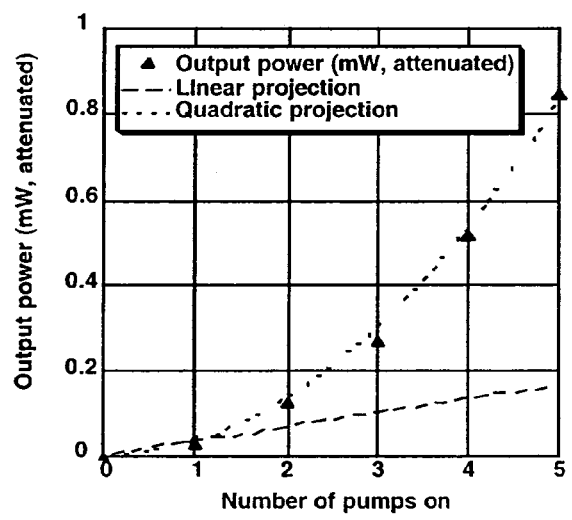

The results of power measurements made on the apparatus 600 depicted in FIG. 6 are shown in FIG. 7. If there were no coherence between the five lasers, one would expect ⅕ of whatever total power was being produced by the fiber lasers to appear in the output arm of the coupler 610, where the power sampling measurements were made. Furthermore, one would expect linear growth of the power as the number of turned-on lasers increases. Instead, FIG. 7 shows that there was a $N^2$ growth of power as the total number of turned-on lasers N increased. This indicates that the laser beams from each fiber laser were coherently inphase in the arm of the coupler 610 at which the power measurements were made.

Figure 8:
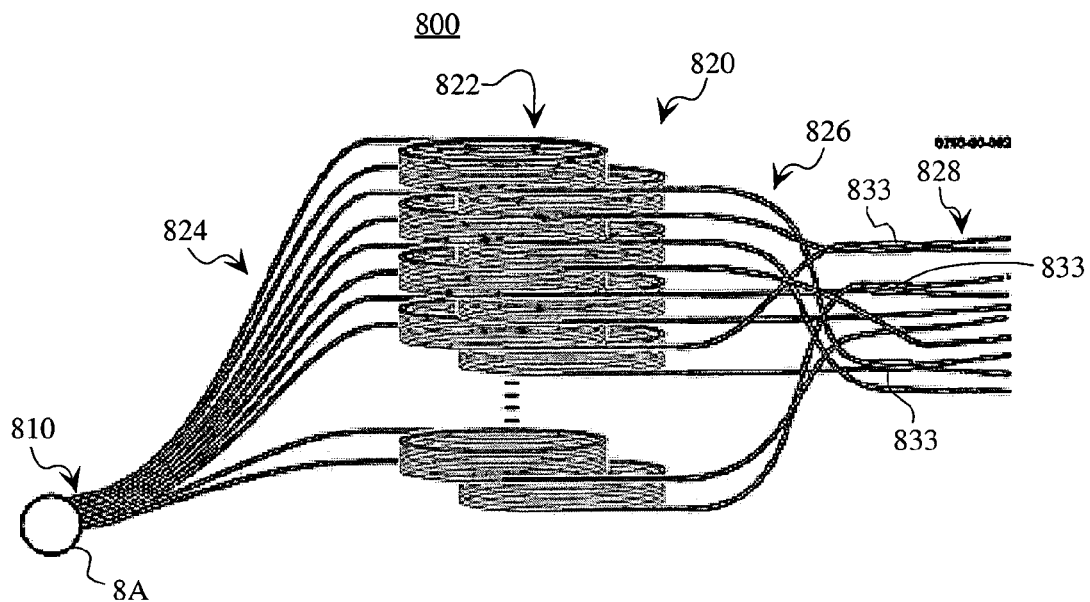
FIG. 8 shows another embodiment according to the present invention where a plurality of fiber lasers are coupled at one end with a coupler and various pairs of lasers are coupled at the other end providing additional coupling between array regions.

Another embodiment of a laser apparatus 800 according to the present invention is shown in FIG. 8. The laser apparatus comprises a plurality of optical fiber paths 820 and a coupler 810. Each optical fiber path 820 comprises: a doped segment 822, which receives laser pumping energy; a coupling connection segment 824, which connects the optical fiber path 820 to the coupler 810; and a reflector connection segment 826, which contains a fiber grating reflector 828 or connects the optical fiber path 820 to a high reflectivity device. The reflector connection segments 826 of particular ones of the optical fiber paths 820 may be coupled together in pairs with couplers 833. Each optical fiber path 820 may comprise a single optical fiber with the described segments or may comprise multiple optical fibers coupled together to form the described segments using techniques known in the art.

Figure 8A:
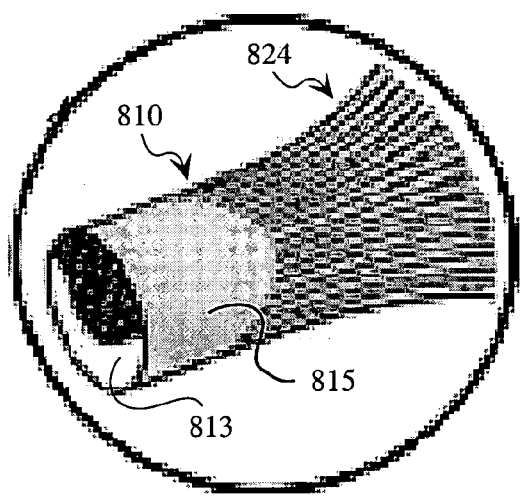
FIG. 8A shows a close-up of the coupler shown in FIG. 8.

The main coupler 810 is shown in more detail in FIG. 8A. The coupler 810 comprises the coupling connection segment 824 of the plurality of optical fiber paths 820 bundled together, stretched, and fused to form a coupling section 815 that provides a zone of high local-neighbor coupling. The coupler 810 preferably additionally comprises a surface 813 that has been cleaved or polished flat and coated to provide for partial reflection and partial transmission of the laser light produced within the optical fiber paths 820. Preferred embodiments of the coupler are described in additional detail in the copending and commonly assigned U.S. Provisional Patent Application Ser. No. 60/441,026, titled "Method and Apparatus for Combining Laser Light," or U.S. patent application Ser. No. 10/759,511, also titled "Method and Apparatus for Combining Laser Light."

Each optical fiber path 820 forms a fiber oscillator due to the application of pump energy to the doped segment 822 and the resonant cavity formed by the surface 813 at the coupler 810 and the fiber grating reflector 828 in each optical fiber path 820. Therefore, the coupler 810 provides the ability to combine the laser light from each optical fiber path 820 into a single laser beam, much like the coupler 610 for the apparatus depicted in FIG. 6. The degree of coupling between the laser light from each optical fiber path 820 can be controlled by the amount of stretch and the length of the bundled fibers at the coupler 810. The fibers are tuned to give the required degree of coupling for a particular connectivity. Preferably, the fibers are not narrowed so much that they no longer support a propagating mode.

Due to the paired coupling of the reflector connection segments 826 of the optical fiber paths 820, the optical fiber paths 820 may be viewed as cluster coupled. Cluster coupling allows the array to behave as if all the elements of the array were directly coupled to all the other elements of the array. This is an important consideration since "all-to-all" coupled systems can display spontaneous order-disorder transitions that are excluded from one-dimensional or two-dimensional systems with only local array interactions. Since at any slice of the apparatus 800 only local interactions will be present between array members, it is preferred that the cluster coupling be present for a coherent state to spontaneously form.

Figure 9:
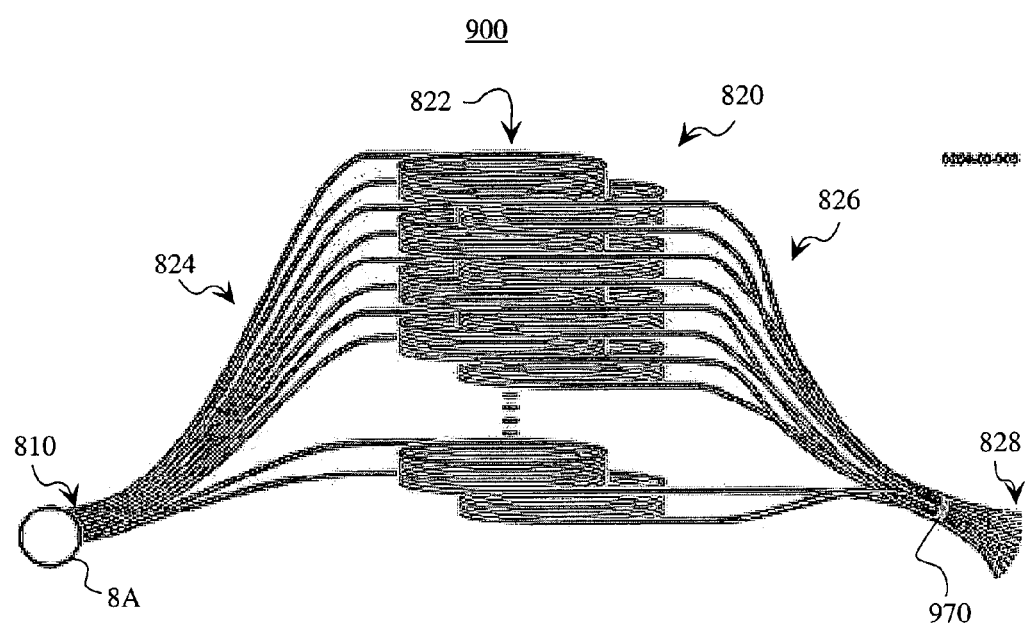
FIG. 9 shows another embodiment according to the present invention where the fiber lasers are coupled at both ends by couplers. At each coupler a different set of fibers are spatially close to one another, providing coupling between regions of the fiber laser array.

A laser apparatus 900 according to an alternative embodiment of the present invention in which a coupler is used is depicted in FIG. 9. The laser apparatus 900 shown in FIG. 9 differs from the apparatus 800 shown in FIG. 8 based on the coupling of the reflector segments 826 of the optical fiber paths 820. That is, the laser apparatus 900 shown in FIG. 9 still comprises a plurality of optical fiber paths 820 and a coupler 810. Each optical fiber path 820 still comprises: a doped segment 822, which receives laser pumping energy; a coupling segment 824, which couples the optical fiber path 820 to the coupler 810; and a reflector connection segment 826, which contains a fiber grating reflector 828 and couples the optical fiber path 820 to a high reflectivity device. However, a second coupler 970 is used to couple together all of the reflector connection segments 826. The second coupler 970 may comprise a bundled and fused coupler similar to the coupler 810, or may comprise other couplers known in the art to provide the capability to couple multiple fibers in a fiber-to-fiber fashion.

Preferably, the optical fiber paths 820 are coupled together in the second coupler 970 in a different pattern than the paths 820 coupled together in the coupler 810. That is, it is preferred that the same paths 820 are not adjacent each other in both the coupler 810 and the second coupler 970. A random coupling pattern may be used in the second coupler 970 to ensure that at least some of the paths are not mapped into the same locations. Alternatively, a designated pattern determined by theoretical analysis may be used to achieve specified coupling requirements.

The apparatus 900 shown in FIG. 9 may be viewed as having a type of "fiber weave," that is, optical fibers that have cross-sections that form regular two-dimensional lattices interacting with local neighbors via spatially decaying evanescent coupling at the coupler 810, and interacting with different fibers at the second coupler 970. This architecture provides the characteristics necessary for spontaneous self-organization of coherent oscillator arrays.

The embodiments depicted in FIGS. 8 and 9 are particularly suited for implementation with fiber lasers. The fiber laser architecture depicted in FIGS. 8 and 9 should have the capability to spontaneously organize the array of optical fiber paths into frequency-locked (i.e., coherent) and phase-ordered states.

The fiber laser architecture shown in FIGS. 8 and 9 should also be flexible enough to allow for the addition of more coupling (i.e., bundled, stretched, and fused regions) in series to provide for more elaborate coupling between larger numbers of fibers. If the fiber oscillators provide high power levels, the other components, such as the couplers and undoped fiber sections, must, of course, be capable of handling these high power levels. Power handling as disclosed in the embodiments is determined by the individual fibers and the range of powers over which the array is stable. The array output is controlled through the amount of power that is applied to the pumping region.

However, the power handling issues related to embodiments according to the present invention are not as critical as the issues related to systems employing narrow band optical amplifiers. Since the oscillators in the embodiments according to the present invention can operate broadband, the power limits imposed by stimulated Brillouin scattering (SBS) and other nonlinear effects are considerably eased. The fiber gratings that can be produced in fibers are sufficiently broad that the allowed oscillation bandwidth is many times the SBS bandwidth. Therefore, nonlinear optical effects are not expected to limit operation.

From the foregoing description, it will be apparent that the present invention has a number of advantages, some of which have been described herein, and others of which are inherent in the embodiments of the invention described or claimed herein. Also, it will be understood that modifications can be made to the apparatus and method described herein without departing from the teachings of subject matter described herein. For example, while certain embodiments of the present invention are described above as being implemented with optical fiber devices, other embodiments of the present invention may be implemented by using free space optics and non-fiber lasers. As such, the invention is not to be limited to the described embodiments except as required by the appended claims.

What is claimed is:

1. A method of coherently combining multiple laser oscillators, comprising:
providing a plurality of lasers;
coupling the plurality of lasers;
configuring the coupling between the plurality of lasers so that each laser interacts with at least one other laser;
pulling an intrinsic frequency distribution of the at least one other laser,
wherein the interactions between the lasers form a coherent optical output; and
providing at least partially reflective reflector to receive the coherent optical output.

2. The method of claim 1, wherein outputs of the plurality of lasers have relatively equal phases.

3. The method of claim 2, wherein the plurality of lasers comprise a plurality of fiber lasers and fiber couplers are utilized to couple the optical outputs of the plurality of fiber lasers so that the plurality of fiber lasers form inphase states.

4. The method of claim 1, wherein providing a plurality of lasers comprises:
providing a plurality of fibers having regions comprising a lasing medium;
disposing a second at least partially reflective reflector at one end of each of the fibers of the plurality of fibers;
pumping the lasing medium of each of the fibers with pump energy.

5. The method of claim 1, wherein providing the plurality of lasers comprises:
providing a plurality of fibers coupled at a combiner on a second end, each fiber having a second at least partially reflective reflector disposed at a first end and having a laser active region comprising laser active material; and
pumping the laser active region of each fiber with pump energy.

6. The method of claim 5, wherein the combiner is configured to provide spontaneous formation of inphase states among the light propagating in the plurality of fibers.

7. The method of claim 5, wherein the combiner comprises:
a coupler coupling each fiber of the plurality of fibers.

8. The method of claim 7, wherein the output of the coupler is radiated in freespace to said at least partially reflective reflector.

9. The method of claim 7, wherein the output of the coupler is directed to said at least partially reflective reflector by an optical element.

10. The method of claim 5 further comprising coupling together the plurality of fibers at a position proximate to the first end.

11. The method of claim 5 comprising coupling together pairs of fibers of the plurality of fibers at a position proximate to the first end.

12. The method of claim 1 wherein the lasers comprise fiber lasers having lengths within 10% of each other.

13. An apparatus comprising:
a plurality of optical fibers, each optical fiber having a first reflector disposed at a first end and having a laser active region comprising laser active material;
one or more laser pump devices for applying pump energy to the laser active region of each optical fiber of the plurality of optical fibers; and
a combiner coupled to a second end of each of the optical fibers, the combiner combining light directed from the plurality of optical fibers and producing an optical output,
wherein said combiner comprises:
a first coupler coupling each of the plurality of optical fibers; and a second reflector for receiving light from an output of the coupler and transmitting the optical output from the combiner, and wherein said combiner is configured to couple the light directed from each fiber so that the light from one fiber interacts with at least one other fiber to pull an intrinsic frequency distribution of the light of the at least one other fiber.

14. The apparatus of claim 13, wherein pairs of the plurality of optical fibers are coupled at second couplers disposed between the reflector and the laser active region of each of the plurality of optical fibers.

15. The apparatus of claim 13, wherein the plurality of optical fibers are coupled at a second coupler disposed between the first reflector and the laser active region of each of the plurality of optical fibers.

16. The apparatus of claim 13, wherein the output of the first coupler is radiated in freespace.

17. The apparatus of claim 13, wherein the output of the first coupler is directed to an optical element.

18. The apparatus of claim 13, wherein the second reflector partially reflects light back to the coupler and partially transmits the optical output.

19. The apparatus of claim 13, wherein the optical fibers have lengths within 10% of each other.

20. The apparatus of claim 13, wherein said first coupler is formed by stretching and fusing the optical fibers and the degree of coupling between the fibers is controlled by the amount of stretching and the lengths of the fibers in the stretched and fused region.

21. The apparatus of claim 15, wherein the optical fibers are coupled in a different patterns in the first coupler and the second coupler.

22. A laser apparatus comprising:
a plurality of laser devices;
means for pulling an intrinsic frequency distribution of the laser devices to form a coherent optical output; and
a reflective means to receive the coherent optical output.

23. The laser apparatus of claim 22, wherein a laser light of each of the laser devices have relatively equal phases.

24. The laser apparatus of claim 22, wherein the plurality of laser devices comprise a plurality of laser active optical fibers configured to operate as lasers and further comprising means for applying pump energy to said plurality of laser active optical fibers.

25. The laser apparatus of claim 24, wherein the means for pulling comprises fiber couplers that couple the laser light of the plurality of laser active optical fibers so that a laser light of the plurality of laser active optical fibers form inphase states.

26. The laser apparatus of claim 24, further comprising:
a second reflective means at a first end of each of the laser active optical fibers.

27. The laser apparatus of claim 24, wherein the means for pulling is configured to provide spontaneous formation of inphase states among the light propagating in the plurality of laser active optical fibers.

28. The laser apparatus of claim 26, wherein the reflective means receives the coherent optical output by free space radiation.

29. The laser apparatus of claim 26, wherein the reflective means receives the coherent optical output by an optical element.

30. The laser apparatus of claim 26 further comprising a second coupling means coupling together the plurality of laser active optical fibers at a position proximate to the first ends.

31. The laser apparatus of claim 26 further comprising a coupling means coupling together pairs of the plurality of laser active optical fibers at a position proximate to the first ends.

32. The laser apparatus of claim 24 wherein the laser active optical fibers have lengths within 10% of each other.

33. The laser apparatus of claim 24 wherein resonators formed by each of the laser active optical fibers have low Qs.

34. An apparatus comprising:
a plurality of optical fibers, each optical fiber having a first reflector disposed at a first end and having a laser active region comprising laser active material;
one or more laser pump devices for applying pump energy to the laser active region of each optical fiber of the plurality of optical fibers;
a combiner coupled to a second end of each of the optical fibers, the combiner combining light directed from the plurality of optical fibers and producing an optical output; and
at least partially reflective reflector to receive the optical output,
wherein said combiner is configured to couple the light directed from each fiber so that the light from one fiber interacts with at least one other fiber to pull an intrinsic frequency distribution of the light of the at least one other fiber,
wherein the optical fibers have lengths within 10% of each other.

* * * * *